United States Patent [19]

Hayashi et al.

[11] Patent Number: 5,066,702

[45] Date of Patent: Nov. 19, 1991

[54] RUBBER COMPOSITION FOR TIRE TREADS

[75] Inventors: Hirofumi Hayashi, Ibaraki; Yo Matsumoto, Itami, both of Japan

[73] Assignee: Toyo Tire & Rubber Company, Limited, Osaka, Japan

[21] Appl. No.: 508,196

[22] Filed: Apr. 12, 1990

[30] Foreign Application Priority Data

Apr. 13, 1989 [JP] Japan ................................. 1-93881

[51] Int. Cl.$^5$ ..................... B60C 11/14; C08K 3/20; C08K 3/26; C08L 9/00
[52] U.S. Cl. ............................. 524/426; 152/209 R; 152/210; 152/211; 524/430; 524/444; 524/449
[58] Field of Search ............. 524/571, 572, 573, 574, 524/575, 575.5, 430, 426, 444, 449; 152/209 R, 210, 211

[56] References Cited

U.S. PATENT DOCUMENTS

| | | | |
|---|---|---|---|
| 4,348,311 | 9/1982 | Machurat et al. | 524/575.5 |
| 4,624,977 | 11/1986 | Takeshita | 524/571 |
| 4,678,830 | 7/1987 | Sato et al. | 524/571 |
| 4,820,751 | 4/1989 | Takeshita et al. | 524/571 |
| 4,886,850 | 12/1989 | Ogawa et al. | 524/430 |
| 4,918,130 | 4/1990 | Kano et al. | 524/430 |

*Primary Examiner*—Allan M. Lieberman
*Attorney, Agent, or Firm*—Armstrong, Nikaido, Marmelstein, Kubovcik & Murray

[57] ABSTRACT

A tire tread rubber composition including a diene rubber and at least one of silica and carbon black, the composition being characterized in that the amount of extract (E) defined below satisfies the equation (1) and that a hard filler 0.01 to 5 mm in mean particle size and at least 100kg/mm$^2$ in Knoop hardness is used in an amount of 3 to 80 parts by weight per 100 parts by weight of the component rubber of the composition subjected to extraction with acetone/chloroform after the vulcanization of the composition, wherein said equation is $$E < 0.4 (A - 38)$$

(1)

wherein E and A are as defined in the specification.

4 Claims, No Drawings

RUBBER COMPOSITION FOR TIRE TREADS

The present invention relates to a rubber composition for tire treads.

Studded tires heretofore in use are satisfactory in skid resistance and traction property but abrade the paved surfaces of common roads, giving rise to the problem of releasing dust.

The main object of the present invention is to provide a rubber composition for the treads of nonstudded tires which exhibit excellent performance on both ice and snow to eliminate the above problem on common paved road surfaces.

The above and other objects of the invention will become apparent from the following description.

The present invention provides a tire tread rubber composition comprising a diene rubber and at least one of silica and carbon black, the composition being characterized in that the amount of extract (E) defined below satisfies the equation (1) and that a hard filler 0.01 to 5 mm in mean particle size and at least 100 kg/ mm$^2$ in Knoop hardness is used in an amount of 3 to 80 parts by weight per 100 parts by weight of the component rubber of the composition subjected to extraction with acetone/chloroform after the vulcanization of the composition.

$$E < 0.4(A - 38) \quad (1)$$

wherein:
E: the amount in parts by weight of the acetone/chloroform extract per 100 parts by weight of the component rubber of the vulcanized composition subjected to the extraction.
A: the sum of the amount in parts by weight of carbon black and one-half of the amount in parts by weight of silica per 100 parts by weight of the component rubber, as determined for the vulcanized composition subjected to the extraction.

Examples of component diene rubbers for use in the rubber composition of the invention are natural rubber (N R), butadiene rubber (B R), styrene-butadiene rubber (S B R), isoprene rubber (I R), isobutylene-isoprene rubber (I I R) and blends of such rubbers. At least one of silica and carbon black are admixed with the component rubber. Silica and carbon black are used in an amount of 30 to 80 parts (by weight, the same as hereinafter), preferably 35 to 55 parts, per 100 parts of the rubber.

The rubber composition of the present invention is characterized in that the amount of extract (E) defined below satisfies the equation (1).

$$E < 0.4(A - 38) \quad (1)$$

wherein:
E: the amount in parts by weight of the acetone/chloroform extract per 100 parts by weight of the component rubber of the vulcanized composition subjected to the extraction.
A: the sum of the amount in parts by weight of carbon black and one-half of the amount in parts by weight of silica per 100 parts by weight of the component rubber, as determined for the vulcanized composition subjected to the extraction.

The acetone/chloroform extraction method and method of measuring the amounts of polymer and carbon black are those according to J I S K6350. The amount of silica is determined by the method of J I S K6220. The acetone/chloroform extract chiefly contains oil, antioxidant and wax.

According to the present invention, a hard filler 0.01 to 5 mm in mean particle size and at least 100 kg/mm$^2$ in Knoop hardness is used in an amount of 3 to 80 parts by weight per 100 parts by weight of the component rubber resulting from the acetone/chloroform extraction of the composition as vulcanized. The Knoop hardness is measured according to J I S Z2251. Examples of useful hard fillers are alumina, granite, quartz, limestone, etc. The filler is preferably 0.02 to 1 mm in mean particle size. If the particle size is less than 0.01 mm, an insufficient effect will result, whereas if it is over 5 mm, the processing machine will be heavily burdened and is likely to become damaged or broken.

According to the invention, the filler of such a large particle size as mentioned above is less likely to reinforce the rubber. When the filler of such large particle size is admixed with soft rubber, the resulting composition becomes harder in its entirety to exhibit satisfactory performance on snow. Further since the filler is less likely to bind the rubber, the composition is microscopically in a soft state and comes into microscopically intimate contact with the ground, exhibiting improved performance on ice. The ice of iced roads or the like contains air bubbles about 0.01 to about 0.1 mm in size, so that when the tread rubber surface has projecting filler particles of 0.01 to 5 mm in size, these particles break down ice portions which are thinned by the presence of air bubbles when the tire passes over the ice, ensuring engagement of the tread with the ice. Presumably for this reason, the tire exhibits an effective braking property on ice.

According to the invention, known additives can of course be incorporated into the composition of the above components. Such additives include vulcanizing agents, vulcanization accelerators, vulcanization retarders, organic peroxides, reinforcing agents, fillers, antioxidants, tackifiers and the like.

The rubber composition of the present invention can be prepared by kneading the above components by a usual processing device, such as rolls, Banbury mixer, kneader or the like.

The rubber composition of the invention is advantageously usable for tires which are used with ground contact pressure of 3 to 15 kg/cm$^2$, for example, for tires for trucks, buses, light trucks and ultralight trucks. Especially in the case of tires adapted for use with ground contact pressure of 6 to 15 kg/cm$^2$, the rubber tread prepared from the present composition effectively engages in iced surfaces with increased friction to exhibit improved performance on ice.

The rubber composition of the present invention has excellent low-temperature characteristics and is suited especially for use on iced roads and snow-covered roads.

The present invention will be described with reference to the following examples and comparative examples, in which the parts mentioned merely as such are by weight.

EXAMPLES AND COMPARATIVE EXAMPLES

Rubber compositions were prepared each from 100 parts of the rubber listed in Table 1, specified quantities of carbon black N220, silica and naphthenic oil, 3 parts of zinc oxide, 3 parts of stearic acid, 1 part of antioxidant (Santoflex 13), 1 part of paraffin wax, 1.0 part of vulcanization accelerator ( C B S ) and 2 parts of sulfur, by thoroughly kneading these components together in a Banbury mixer for 4 minutes.

Pneumatic all-weather radial tire, 650R 16 10 P R, were prepared using these rubber compositions and checked for hardness and tested for performance on ice and snow. The hardness was measured at −5° C. according to A S T M D2228. The performance on ice and snow was determined by testing with motor vehicles on iced roads and snow at −8° C. In either case, the motor vehicle was driven at a speed of 40 km/h and braked abruptly to measure the distance the vehicle traveled until it came to a stop after the application of the brake. The performance is expressed in terms of the reciprocal of the measured distance as converted to an index relative to the corresponding value obtained with the tire of composition No. 3 and taken as 100. The higher the value, the better is the performance. Table 1 shows the results. Compositions No. 4 to No. 7 and No. 10 are according to the invention, and the others are comparative compositions.

from the group consisting of alumina, granite, quartz and limestone, said hard filler being 0.01 to 5 mm in mean particle size and at least 100 kg/mm$^2$ in Knoop hardness, said hard filler being used in an amount of 3 to 80 parts by weight per 100 parts by weight of the rubber component resulting from the subjection to extraction with acetone/chloroform of the vulcanized composition, wherein said equation is $$E < 0.4\,(A-38) \qquad (1)$$

and wherein:

E represents the amount in parts by weight of the acetone/chloroform extract per 100 parts by weight of the rubber component of the vulcanized composition which has been subjected to the extraction, and A represents the sum of the amount in parts by weight of carbon black and one-half of the amount in parts by weight of silica per 100 parts by weight of the rubber component, as determined for the vulcanized composition which has been subjected to the extraction, wherein at least one of silica and carbon black is added in an amount of 30 to 80 parts

TABLE 1

| Rubber composition No. | Com. Ex. 1 | Com. Ex. 2 | Com. Ex. 3 | Ex. 4 | Ex. 5 | Ex. 6 | Ex. 7 | Com. Ex. 8 | Com. Ex. 9 | Ex. 10 |
|---|---|---|---|---|---|---|---|---|---|---|
| Component rubber (part) | NR 50 BR 50 | NR 70 BR 30 | NR 100 — | NR 50 BR 50 | NR 70 BR 30 | NR 70 BR 30 | NR 70 BR 30 | NR 70 BR 30 | NR 70 BR 30 | NR 70 BR 30 |
| Carbon black N220 (part) | 65 | 40 | 50 | 65 | 50 | 50 | 50 | 50 | 50 | 50 |
| Silica (part) | — | 14 | — | — | — | — | — | — | — | — |
| Naphthenic oil (part) | 49 | 30 | 8 | 7 | 1 | 1 | — | 1 | 2 | 1 |
| [A] | (69.1) | (50.2) | (52.6) | (70.2) | (52.2) | (51.8) | (49.9) | (51.1) | (52.3) | (50.1) |
| Alumina (0.05~0.25 mmφ) | — | — | — | 26 | 28 | 11 | 39 | 90 | — | — |
| Alumina (up to 0.007 mmφ) | — | — | — | — | — | — | — | — | 30 | — |
| Quartz (0.01~3 mmφ) | — | — | — | — | — | — | — | — | — | 33 |
| Amount of extract [E] | 52.1 | 33.0 | 10.5 | 10.1 | 4.0 | 4.1 | 2.9 | 4.3 | 4.7 | 4.0 |
| [0.4(A−38)] | (12.4) | (4.9) | (5.8) | (12.9) | (5.7) | (5.5) | (4.8) | (5.2) | (5.7) | (4.8) |
| Hardness (−5°C.) | 54 | 62 | 72 | 76 | 75 | 74 | 77 | 80 | 76 | 76 |
| Performance on ice (index) | 118 | 112 | 100 | 114 | 116 | 115 | 110 | 83 | 91 | 121 |
| Performance on snow (index) | 85 | 90 | 100 | 115 | 113 | 108 | 124 | 111 | 107 | 109 |

Table 1 reveals that compositions No. 4 to No. 7 of the invention are excellent in performance on both ice and snow. However, compositions No. 1 to No. 3 failing to satisfy the equation (1) is poor in performance on snow. Compositions No. 8 and No. 9 wherein the filler is outside the range of the invention in particle size or amount used is inferior in performance on ice. The alumina and quartz are 2000 and 1000 kg/mm$^2$, respectively, in Knoop hardness.

We claim:

1. A tire tread rubber composition comprising a diene rubber hand filler, and at least one of silica and carbon black, the composition being characterized in that the amount of extract (E), as defined below, satisfies the equation (1) and that at least one hard filler is selected by weight per 100 parts by weight of the rubber component prior to vulcanization.

2. A tire tread rubber composition as defined in claim 1 wherein at least one of silica and carbon black is used in an amount of 35 to 55 parts by weight per 100 parts by weight of the rubber component.

3. A tire tread rubber composition as defined in claim 1 wherein the rubber composition is suitable for tires which are used with ground contact pressure of 3 to 15 kg/cm$^2$.

4. A tire tread rubber composition as defined in claim 1 wherein said hard filler has an average particle size of from 0.2 to 1 mm.

* * * * *